(12) United States Patent  
Halley et al.

(10) Patent No.: US 7,139,884 B2  
(45) Date of Patent: Nov. 21, 2006

(54) METHOD, APPARATUS AND COMPUTER PROGRAM PRODUCT FOR IMPLEMENTING ENHANCED AUTONOMIC BACKUP USING MULTIPLE BACKUP DEVICES

(75) Inventors: Donald R. Halley, Rochester, MN (US); Paul Douglas Koeller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 10/454,953

(22) Filed: Jun. 5, 2003

(65) Prior Publication Data

US 2004/0250162 A1 Dec. 9, 2004

(51) Int. Cl.  
*G06F 12/16* (2006.01)

(52) U.S. Cl. .................. 711/161; 711/162; 714/6; 707/204; 710/57; 710/112

(58) Field of Classification Search ............... 711/161, 711/162  
See application file for complete search history.

(56) References Cited

U.S. PATENT DOCUMENTS 5,502,811 A * 3/1996 Ripberger .................. 714/6  
6,154,852 A * 11/2000 Amundson et al. ........... 714/5  
6,735,636 B1 * 5/2004 Mokryn et al. ............. 710/5

* cited by examiner

*Primary Examiner*—B. James Peikari  
(74) *Attorney, Agent, or Firm*—Joan Pennington

(57) ABSTRACT

A method, apparatus and computer program product are provided for implementing enhanced autonomic data backup using multiple backup devices. A media definition object is defined for saving predefined user selections including a default backup format to be used, an order to process the libraries, a library exception size, and a maximum number of backup devices to be used serially. A list of libraries is generated by either a user specified order of the libraries or a size order of the libraries from largest to smallest. Each library in the generated list of libraries is processed to form at least one library queue of a serial device wait queue and a parallel device wait queue. A process IO procedure is called until backup completes for each library from the at least one library queue.

20 Claims, 10 Drawing Sheets

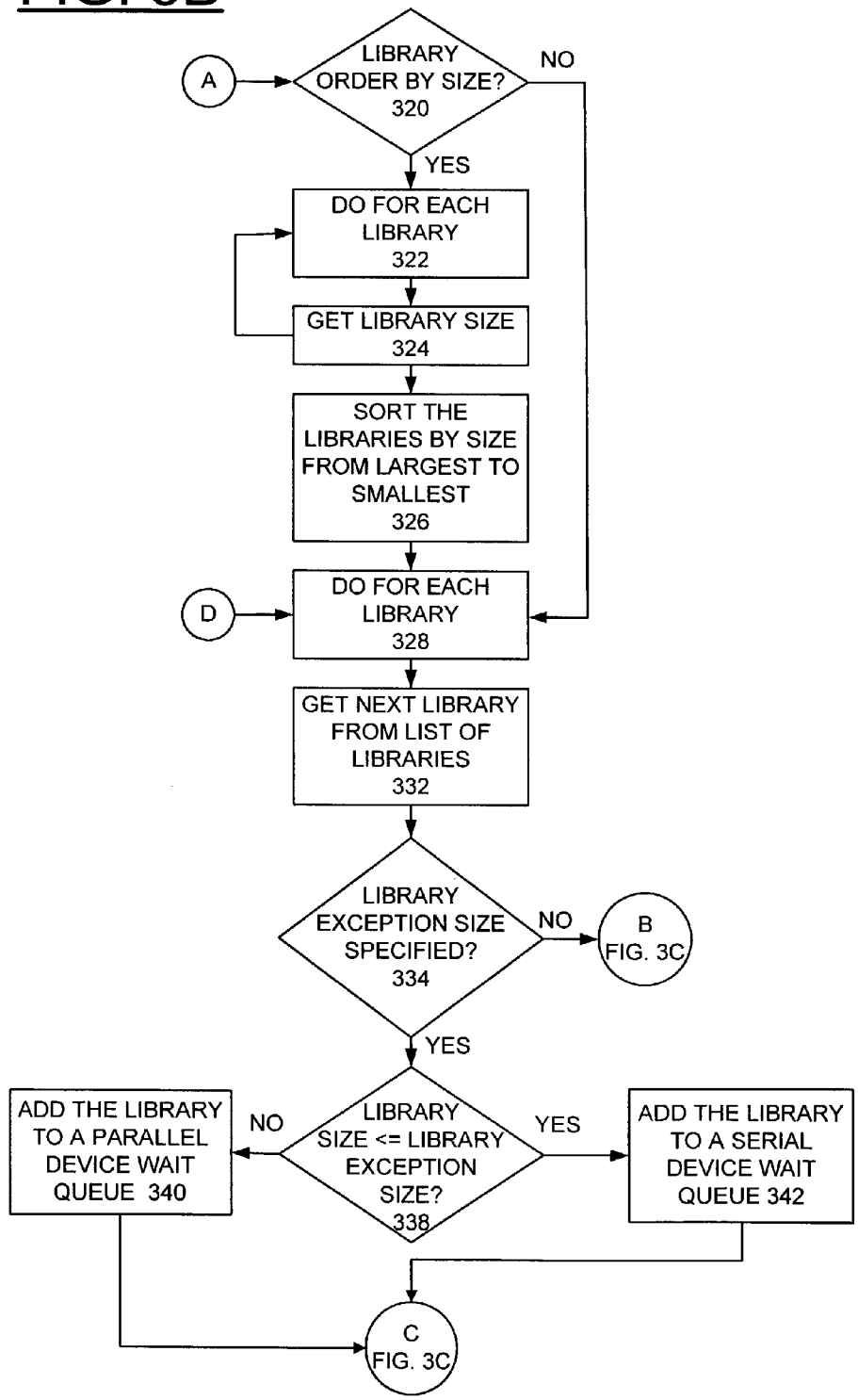

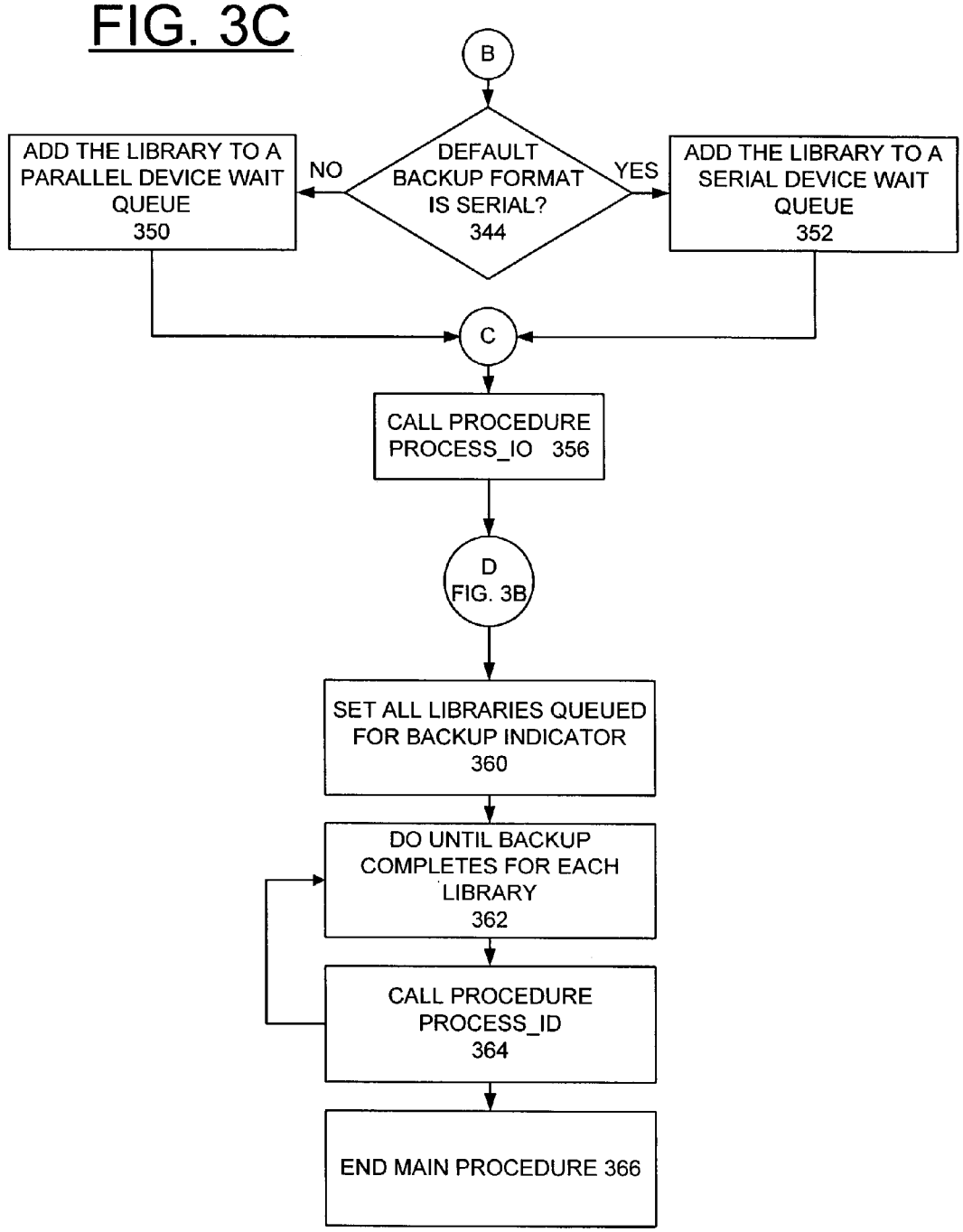

METHOD, APPARATUS AND COMPUTER PROGRAM PRODUCT FOR IMPLEMENTING ENHANCED AUTONOMIC BACKUP USING MULTIPLE BACKUP DEVICES

FIELD OF THE INVENTION

The present invention relates generally to the data processing field, and more particularly, relates to a method, apparatus and computer program product for implementing enhanced autonomic data backup using multiple backup devices.

DESCRIPTION OF THE RELATED ART

As used in the following description and claims, the term library means a container similar to a directory that contains a list of objects that contain the actual data for backup. As used in the following description and claims, the term tape drives includes other forms of backup media, such as optical media, DASDs, and remote servers.

Currently the amount of data that customers need to back up continues to increase. Unfortunately the amount of time available to perform the backup, often referred to as the backup window, typically stays the same or even decreases. In order to successfully complete their backup within the backup window many customers purchase additional backup devices. These backup devices are most often tape libraries with multiple tape devices, although it could also be just additional standalone tape devices or some type of optical devices. The customer then concurrently uses the multiple devices to reduce the total amount of time required to perform the backup.

Tape drives have been used to store a backup copy of data objects onto removable tape media in various computer systems. For example, in the International Business Machines Corporation eServer iSeries Server computer system, the iSeries Server operating system provides users with commands that allow users to make a backup copy of data objects onto removable media, such as tape backup. The iSeries server operating system has provided two ways to support the use of the multiple tape devices: a serial format defined as serially backing up a single library to a single tape device and a parallel format defined as backing up a single library or even a single object to multiple tape devices in parallel.

For example, U.S. Pat. No. 6,154,852 to Amundson et al., issued Nov. 28, 2000 and assigned to the present assignee, discloses a method and apparatus for data backup and recovery. The data backup and recovery method uses a plurality of tape drives in parallel. A unique token is associated with each data object being saved to a tape media. While saving backup data to the plurality of tape drives, a dynamic load balancer dynamically balances the load between the plurality of tape drives. While recovering backup data from tape media, the unique token is utilized for processing tape media files in any order. Data segments of one or more objects are distributed across the parallel tape devices and are non-serial across the tape media files used. When recovering backup data from tape media, the same number or fewer tape drives than used during data saving can be used.

By making use of the serial and parallel formats the iSeries Server operating system provided two alternative methods to utilize multiple tape devices to back up a given set of libraries. An inherent problem with the method to backup each library in parallel format is that while the parallel format works well for very large libraries it is inefficient for small libraries. For small libraries the parallel format backup method can be slower than backing up to a single tape device. This is because tape opens must be performed on each device and at a minimum some control information must be written to each tape. Furthermore, it can complicate a recovery of a small library because the data is spread across multiple tape devices.

The method to back up each library in serial format makes use of the tape drives as they become available. For example, if libraries named A, B, C, . . . Z are to be backed up to three tape drives 1–3 that processing will concurrently back up library A to tape drive 1, library B to tape drive 2, library C to tape drive 3, library D will use which ever tape drive finishes first, and each subsequent library will use the next available tape drive until all libraries have been backed up. The problem with this approach is that each library can be backed up only to a single tape drive. If the customer has one library that is very large, the total backup time might be gated by that one library. Worse yet if the large library happens to be near the end of the list the total backup time may be significantly lengthened. For example, consider the example above but assume that library Z is 1000 times larger than libraries A through Y. While libraries A through Y would complete quite quickly the backup window would not be complete until library Z was backed up to a single tape drive.

To deal with the problems above, currently customers must resort to manually optimizing their backup. For example, they may use the parallel backup method but have to create customized backup procedures to handle libraries that are too small to efficiently be backed up in parallel. They need to omit those small libraries from their general backup and instead run a separate backup to back up those small libraries in serial format. Or likewise, they use the serial backup method and instead identify large libraries. Then they need to omit those large libraries from their general backup and instead run a separate backup to back up those large libraries in parallel.

While the customer ultimately can optimize these approaches, this is time consuming, requiring extensive planning and manual setup by the customer. In addition, the backup procedures also need to be modified as new libraries are created or the sizes of libraries change. There are other problems with these approaches. For example, it is more difficult or in some cases impossible for the user to synchronize their backup data across multiple libraries if they require multiple backup procedures to backup all the data. Finally, the tape drives may be used less efficiently because the tape drives completely stop between the separate backup procedures.

A need exists for an improved mechanism to backup libraries using available tape devices.

SUMMARY OF THE INVENTION

A principal object of the present invention is to provide a method, apparatus and computer program product for implementing enhanced autonomic data backup using multiple backup devices. Other important objects of the present invention are to provide such a method, apparatus and computer program product for implementing enhanced autonomic data backup using multiple backup devices substantially without negative effect and that overcome some of the disadvantages of prior art arrangements.

In brief, a method, apparatus and computer program product are provided for implementing enhanced autonomic data backup using multiple backup devices. A media definition object is defined for saving predefined user selections including a default backup format to be used, an order to process the libraries, a library exception size, and a maximum number of backup devices to be used serially. A backup procedure is started and user selections are identified utilizing the media definition object. A list of libraries for backup is generated responsive to the identified order to process the libraries. Each library in the generated list of libraries is processed to form at least one library queue of a serial device wait queue and a parallel device wait queue. A process IO procedure is called until backup completes for each library from the at least one library queue.

In accordance with features of the invention, the generated list of libraries for backup includes either a user specified order of the libraries or a size order of the libraries from largest to smallest. When the user specifies a library exception size, the library size of each library is compared to the library exception size; each library having the library size less than or equal to the library size exception is added to the serial device wait queue; and each library having the library size greater than the library size exception is added to the parallel device wait queue.

In accordance with features of the invention, the user selection of the maximum number of backup devices to be used serially is used to build a serial device list and a parallel device list of the multiple backup devices. When the maximum number of backup devices to be used serially is the total number of the multiple backup devices, then the multiple backup devices are first used for serial backups and then the multiple backup devices are used for the parallel backups. When the maximum number of backup devices to be used serially is less than the total number of the multiple backup devices, then serial and parallel backups are provided concurrently.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3A, 3B, and 3C are flow charts illustrating exemplary operations for implementing enhanced autonomic data backup in accordance with the preferred embodiment;

DETAILED DESCRIPTION OF THE PREFERRED EMBODIMENTS

Figure 1:
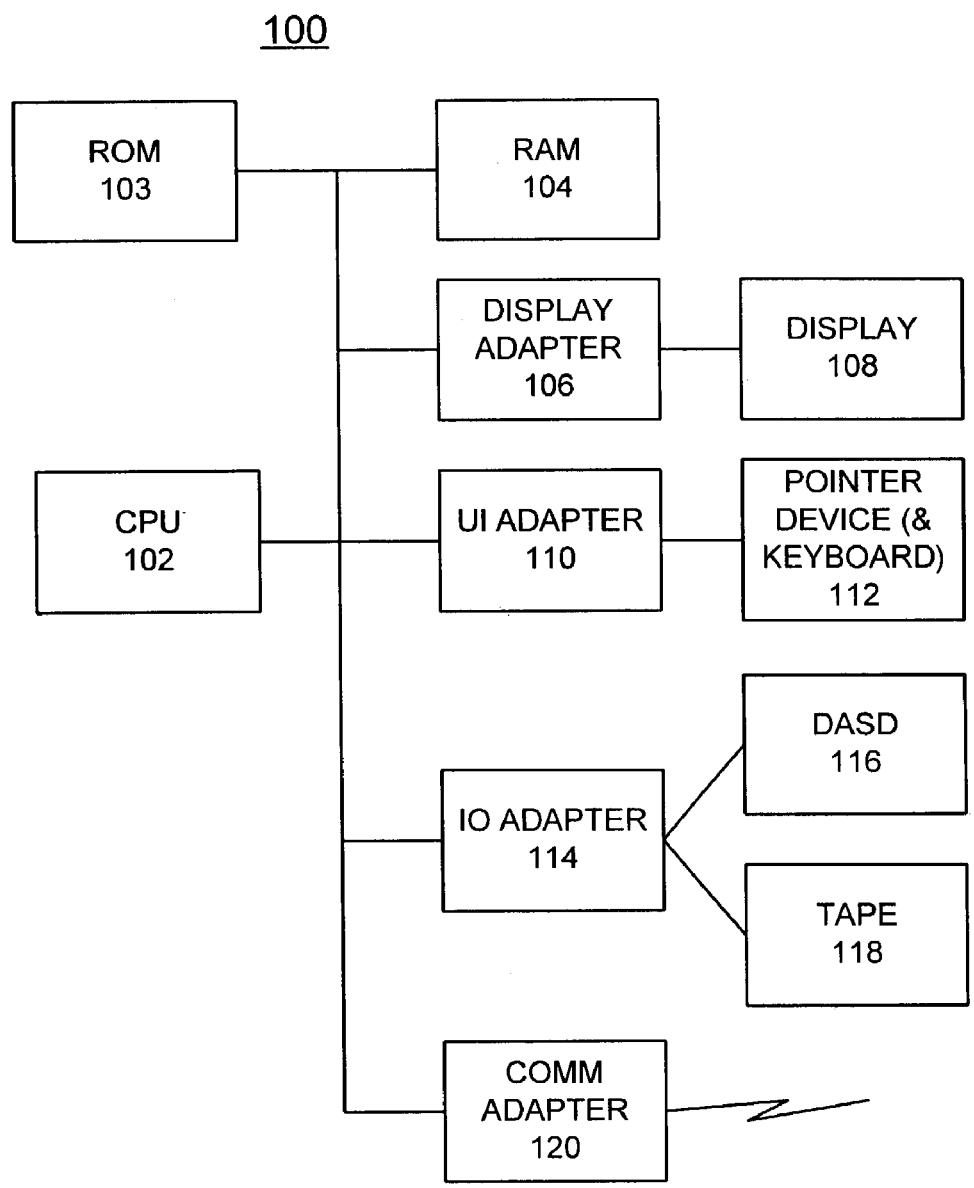
FIGS. 1 and 2 are block diagram representations illustrating a computer system, operating system and data object definitions for implementing methods for enhanced autonomic data backup in accordance with the preferred embodiment.
Figure 2:
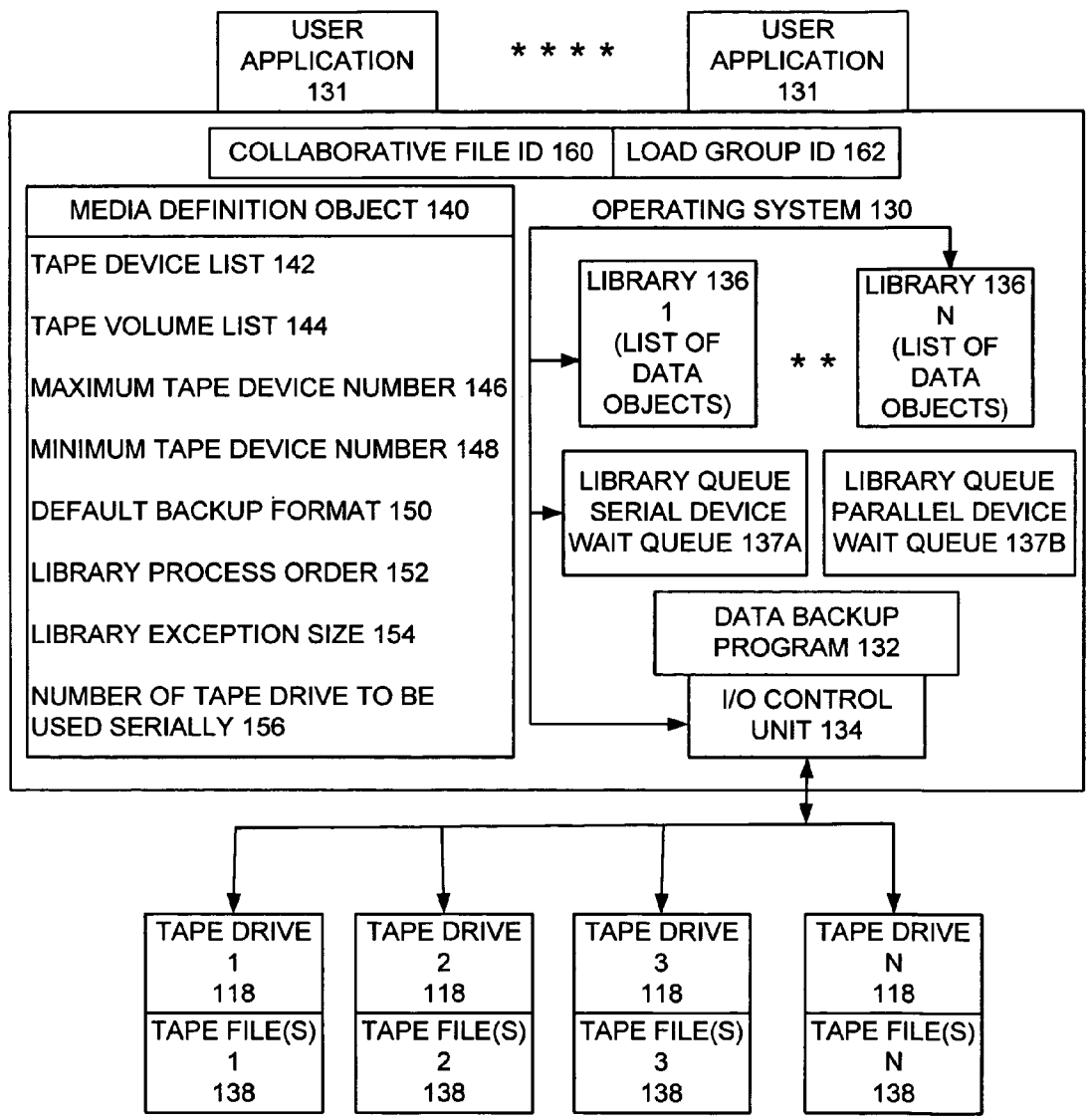

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory or mainstore 104, and a display adapter 106 coupled to a display 108. CPU 102 is connected to a user interface (UI) adapter 110 connected to a pointer device and keyboard 112. CPU 102 is connected to an input/output (I/O) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1.

As shown in FIG. 2, computer system 100 includes an operating system 130 supporting multiple applications 131, and a data backup program 132 of the preferred embodiment used in conjunction with a I/O control unit 134. Computer system 100 includes a plurality of libraries 1-N, 136; a library queue serial device wait queue 137A and a library queue parallel device wait queue 137B: a plurality of tape drives 1-N, 118; and one or more tape files 138 associated with each tape device 118. A data object of the preferred embodiment called a media definition object 140 specifies a tape device list 142 of tape devices that are eligible to be used to perform the backup, a tape volume list 144 of tape volumes that are eligible to be used to perform the backup, a maximum number 146 of tape devices that can be used to perform the backup, and a minimum number 148 of tape devices that are required to perform the backup.

In accordance with features of the invention, an enhanced media definition object 140 of the preferred embodiment is provided to solve the problems of conventional data backup methods. The media definition object 140 of the preferred embodiment is used to implement optimal autonomic backup of a given set of libraries using either of two alternative methods, to backup each library in parallel format or in serial form.

A conventional media definition object allows the user to specify the list of tape devices that are available to be used, the list of tape volumes to use on each device, the minimum number of tape devices that must be available to start the backup, and a maximum number of tape devices to use for the backup.

In accordance with features of the invention, additional fields in the enhanced media definition object 140 allow the user to specify a default backup format 150 to be used, an order to process the libraries or a library process order 152, a library exception size 154, and a number of tape drives to be used serially 156. By specifying the new fields 150, 152, 154, and 156, the data backup program 132 of the preferred embodiment can optimize the use of multiple devices 118 to perform the data backup. The method of the preferred embodiment frees the user from having to manually plan and setup their backups. The method of the preferred embodiment also optimizes the backup each time it is run. For example, if new libraries are added or libraries significantly increase in size they are handled automatically without requiring the user to customize their backup procedures.

The tape devices 118 can be either stand alone tape devices or the names of tape media library devices that contain multiple tape devices. A unique collaborative file ID 160 is associated with each piece of data written to tape media for each data backup. A unique load group ID 162 is appended to the collaborative file ID 160 during recovery processing.

Various commercially available processors could be used for computer system 100, for example, an IBM personal computer or similar workstation can be used. An example of a specific computer system on which the invention may be implemented is the International Business Machines Corp. iSeries Server computer system. Central processor unit 102 is suitably programmed to execute the flowcharts of FIGS. 3A, 3B, 3C, 4A, 4B, 4C, 4D, and to process and utilize user selections in the media definition object 140 of the preferred embodiment. Control program 132 provides the suitable programming for the central processor unit 102 to perform the methods of the preferred embodiment.

The default backup format 150 defines the default backup format used for each library. The default backup format 150 for each library is either parallel format or serial format. With the user selected default format for each library of serial format, each library is backed up in serial format using specified tape devices as they become available.

The library processing order 152 defines the order to be used when processing the list of libraries. The library processing order 152 enables processing the libraries in a particular library order specified by the user or in a size order. In some cases users have reasons why they want libraries backed up in some specific order. For example, there may be order dependencies between libraries or they may want their most critical libraries backed up first on the tape.

The library processing order 152 enables processing the libraries in size order from largest to smallest. For many customers, using a default format of serial format for using tape devices as they become available, and specifying this size sort order is sufficient to substantially optimize their backup. The reason being that the largest library is the first one sent to a tape device so it can be backed up while subsequent smaller libraries are backed up to the other available tape drives.

The library exception size 154 defines a library size to be used when determining which backup format to use. If the default format is serial then this value specifies that libraries larger than the specified exception size 154 should be backed up in parallel format. If the default format is parallel then this value specifies that libraries smaller than the specified exception size 154 should be backed up in serial format.

The number of tape devices to be used serially 156 defines the maximum number of tape drives to be used serially as they become available. The user can specify the number of tape devices to be used serially 156 equal to the total number of tape drives 1-N, 118 to use all of the specified tape drives 1-N, 118 as the tape drives become available. This enables all of the specified tape drives 1-N, 118 first being used as they become available to back up libraries that qualify for backup in serial format. When that backup in serial format completes, all of the tape drives 1-N, 118 will then be used to back up the libraries that qualify to be backed up in parallel format.

The user can specify a number of tape devices to be used serially 156 that is a subset of the total number of specified tape drives. This enables the specified number 156 of tape drives to be used as available to back up libraries that qualify to be backed up in a serial format. Concurrently with the serial backups, the remaining tape drives will be used to back up the libraries that qualify to be backed up in a parallel format.

Figure 3A:
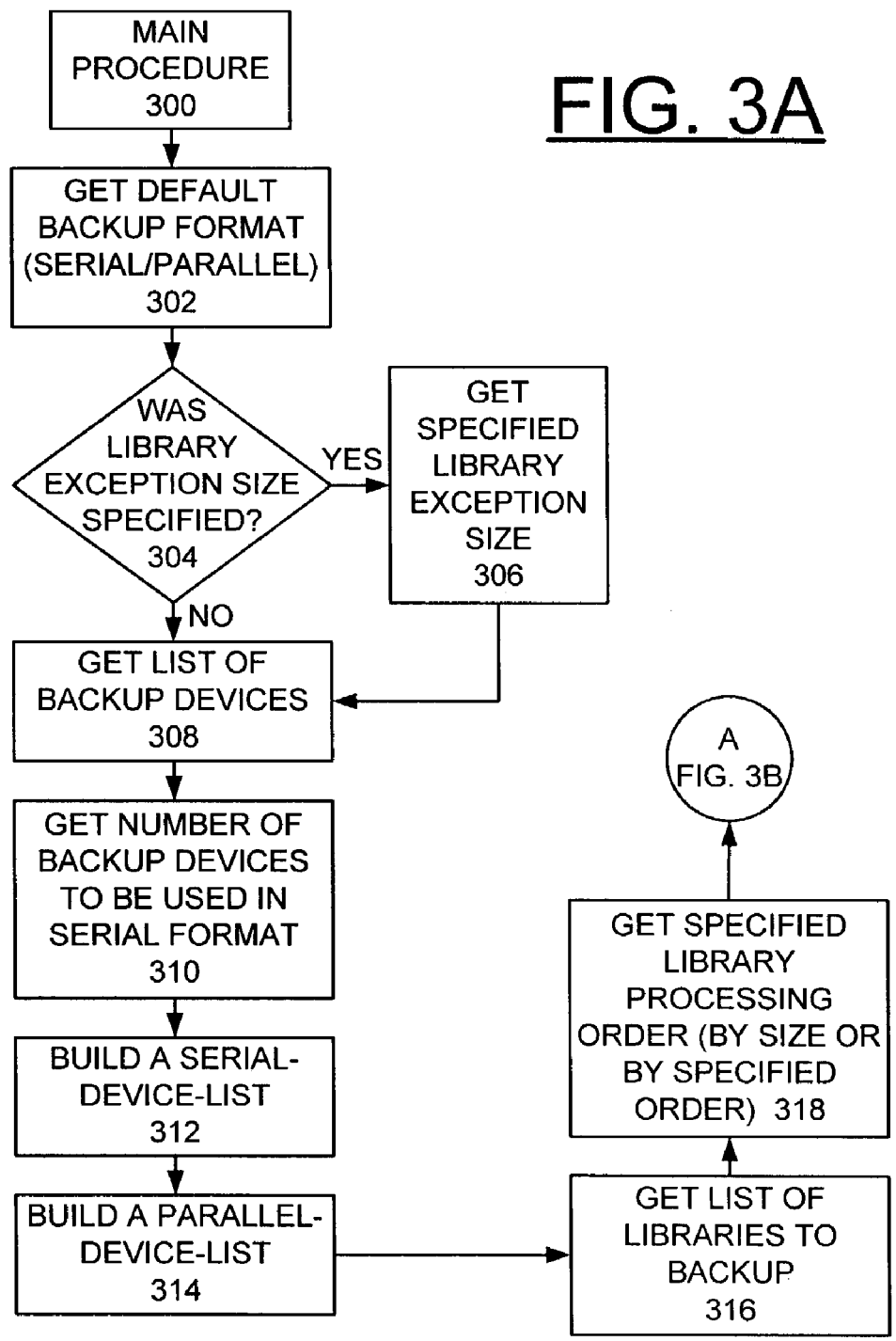

Referring now to FIGS. 3A, 3B, and 3C, there are shown exemplary operations for implementing enhanced autonomic data backup in accordance with the preferred embodiment. A main procedure of the preferred embodiment starts as indicated in a block 300 in FIG. 3A. The default backup format 150 that defines either serial or parallel format is identified as indicated in a block 302. Checking whether a library exception size 154 was specified is performed as indicated in a decision block 304. If so, the library exception size 154 is identified as indicated in a block 306. Then the list of backup devices 142 is identified as indicated in a block 308. The number of tape devices to be used serially 156 is identified as indicated in a block 310. Next a serial device list is built as indicated in a block 312. A parallel device list is built as indicated in a block 314. A list of libraries to backup is obtained as indicated in a block 316. The library processing order 152, by size or by specified order, is identified as indicated in a block 318. Then the sequential operations continue following entry point A in FIG. 3B.

Referring to FIG. 3B, checking for library processing by size being selected by the library processing order 152 is performed as indicated in a decision block 320. If processing by size is selected; then for each library, the library size is identified as indicated in blocks 322 and 324. Then the libraries are sorted by size from largest to smallest as indicated in a block 326. Next processing for backup is performed using in the library list in the user specified order or the library list having been sorted by size order, for each library as indicated in a block 328, a next library from the list of libraries is obtained as indicated in a block 332, checking for a specified library excepting size 154 is performed as indicated in a decision block 334. If no library exception size 154 is identified, then the sequential operations continue following entry point B in FIG. 3C. If a library exception size 154 is identified, then checking is performed for each library to determine whether the library size is less than or equal to the specified library exception size as indicated in a decision block 338. If library size is greater than the specified library exception size, the library is added to a parallel device wait queue 137B as indicated in a block 340. If the library size is less than or equal to the specified library exception size, the library is added to a serial device wait queue 137A as indicated in a block 342. Then the sequential operations continue following entry point C in FIG. 3C.

Referring to FIG. 3C following entry point B, checking whether the default backup format 150 is serial is performed as indicated in a decision block 344. If the default backup format 150 is not serial, then the library is added to the parallel device wait queue 137B as indicated in a block 350. If default backup format 150 is serial, then the library is added to the serial device wait queue 137A as indicated in a block 352. Next following entry point C, a procedure process_IO, illustrated and described with respect to FIGS. 4A, 4B, 4C, and 4D, is called as indicated in a block 356. Then the sequential steps are repeated for a next library returning to entry point D in FIG. 3B. After each library is processed, then all libraries queued for backup indicator is set as indicated in a block 360. Then the procedure process_IO is called until backup completes for each library as indicated in blocks 362 and 364. Then the main procedure ends as indicated in a block 366.

Referring now to FIGS. 4A, 4B, 4C, and 4D, there are shown exemplary process IO operations for implementing enhanced autonomic data backup in accordance with the preferred embodiment. The process_IO procedure of the preferred embodiment starts as indicated in a block 400 in FIG. 4A. Checking for any backups to complete is performed as indicated in a decision block 402. If any backups have completed, checking whether backup was done in serial format as indicated in a decision block 404. If the backup was done in serial format, then that serial device is marked as available as indicated in a block 406. If the backup was not done in serial format, then that all of the parallel devices are marked as available as indicated in a block 408. If no backups have completed, then the sequential operations continue following entry point E in FIG. 4B.

Figure 4A:
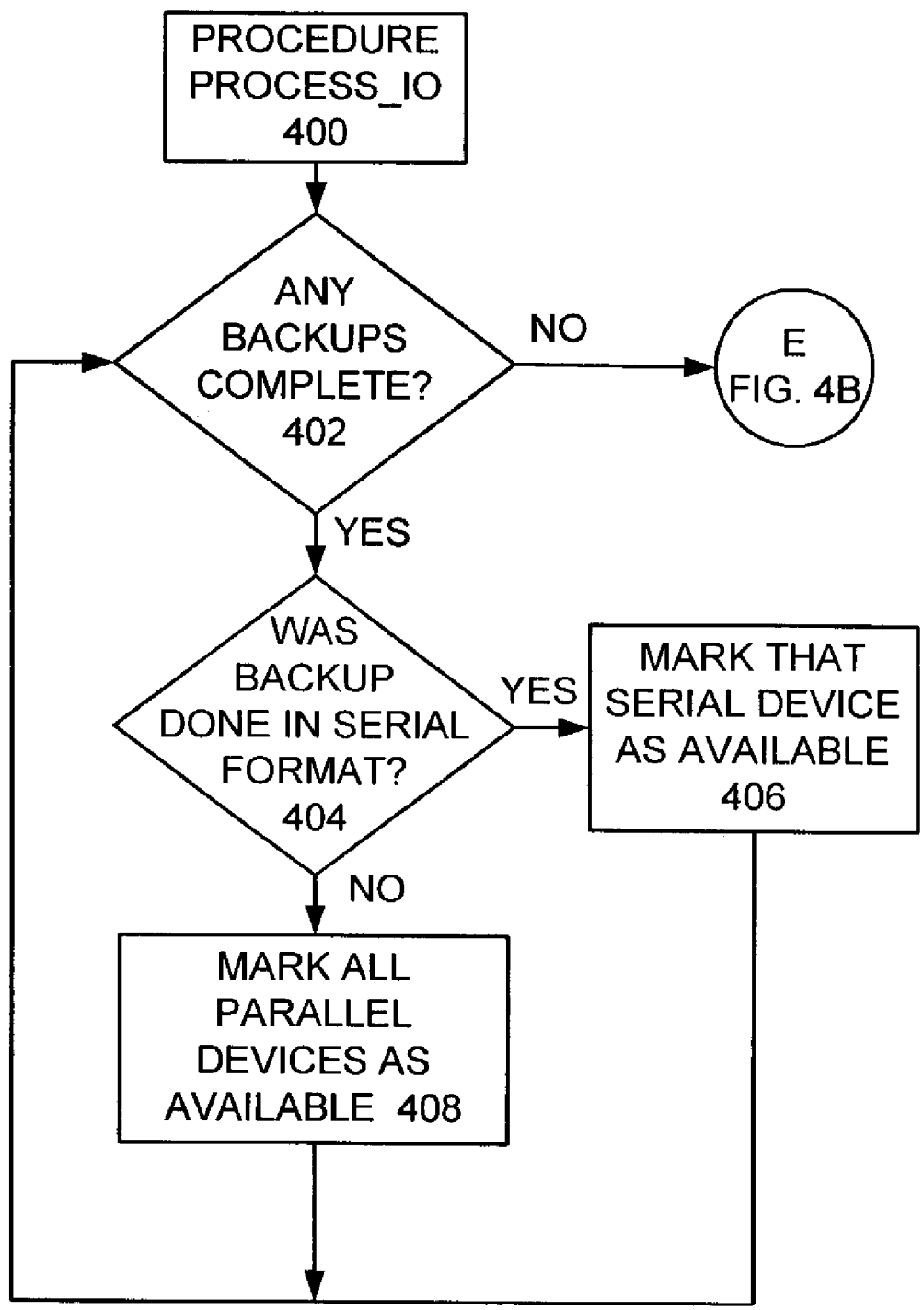
FIGS. 4A, 4B, 4C, and 4D are flow charts illustrating exemplary process IO operations for implementing enhanced autonomic data backup in accordance with the preferred embodiment.
Figure 4B:
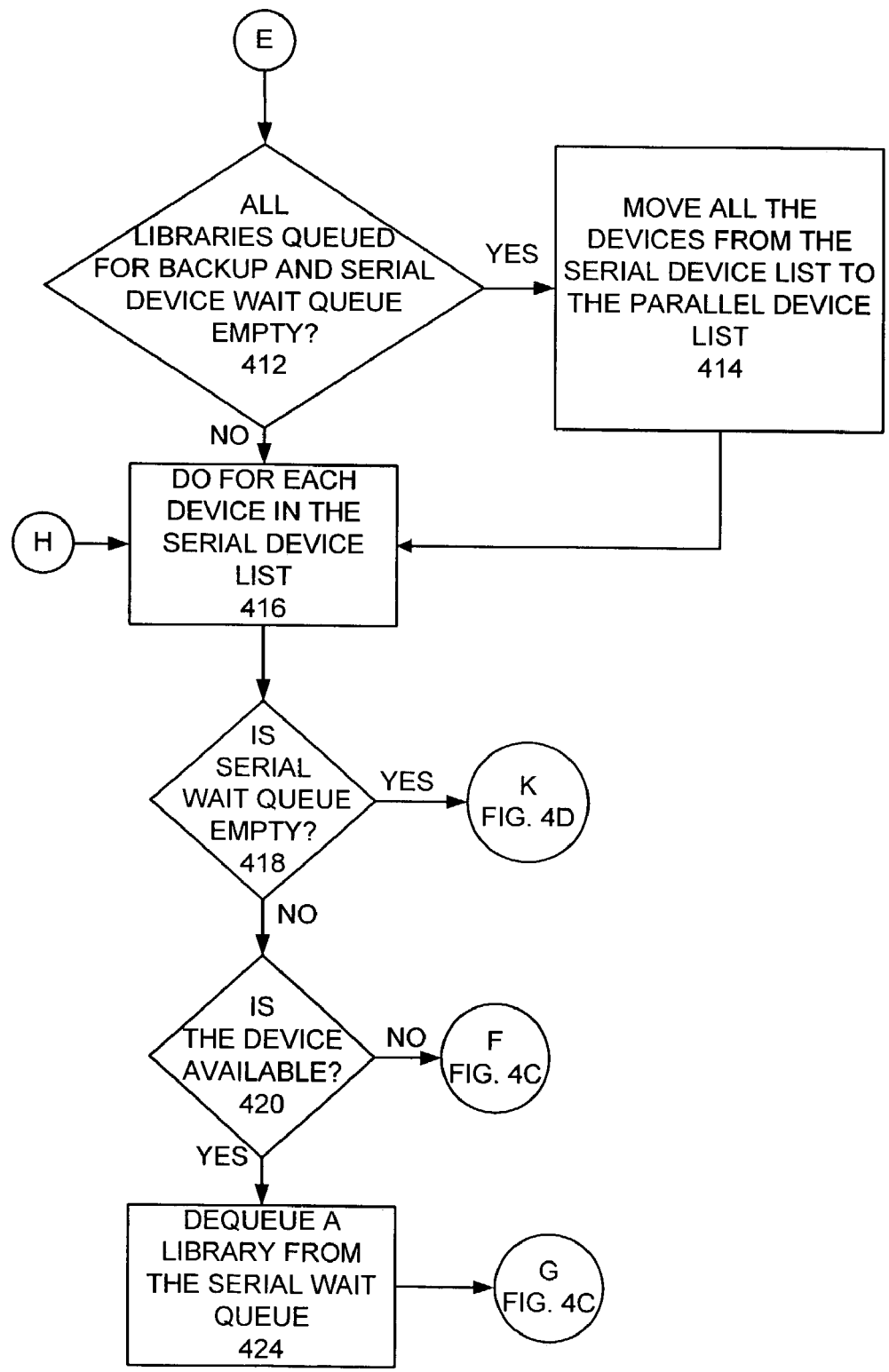

Referring now to FIG. 4B, following entry point E checking whether all libraries queued for backup and serial device wait queue is empty as indicated in a decision block 412. If yes, then all the devices are moved from the serial device list to the parallel device list as indicated in a block 414. If not, then for each device in the serial device list as indicated in a block 416, checking is performed to determine whether the serial wait queue is empty as indicated in a decision block 418. If the serial wait queue is empty, then the sequential operations continue following entry point K in FIG. 4D. If the serial wait queue is not empty, checking whether the device is available as indicated in a decision block 420. If the current device in the serial device list is not available, then the sequential operations continue following entry point F in FIG. 4C. Otherwise if the current device in the serial device list is available, then a library from the serial wait queue is dequeued as indicated in a block 424. Then the sequential operations continue following entry point G in FIG. 4C.

Figure 4C:
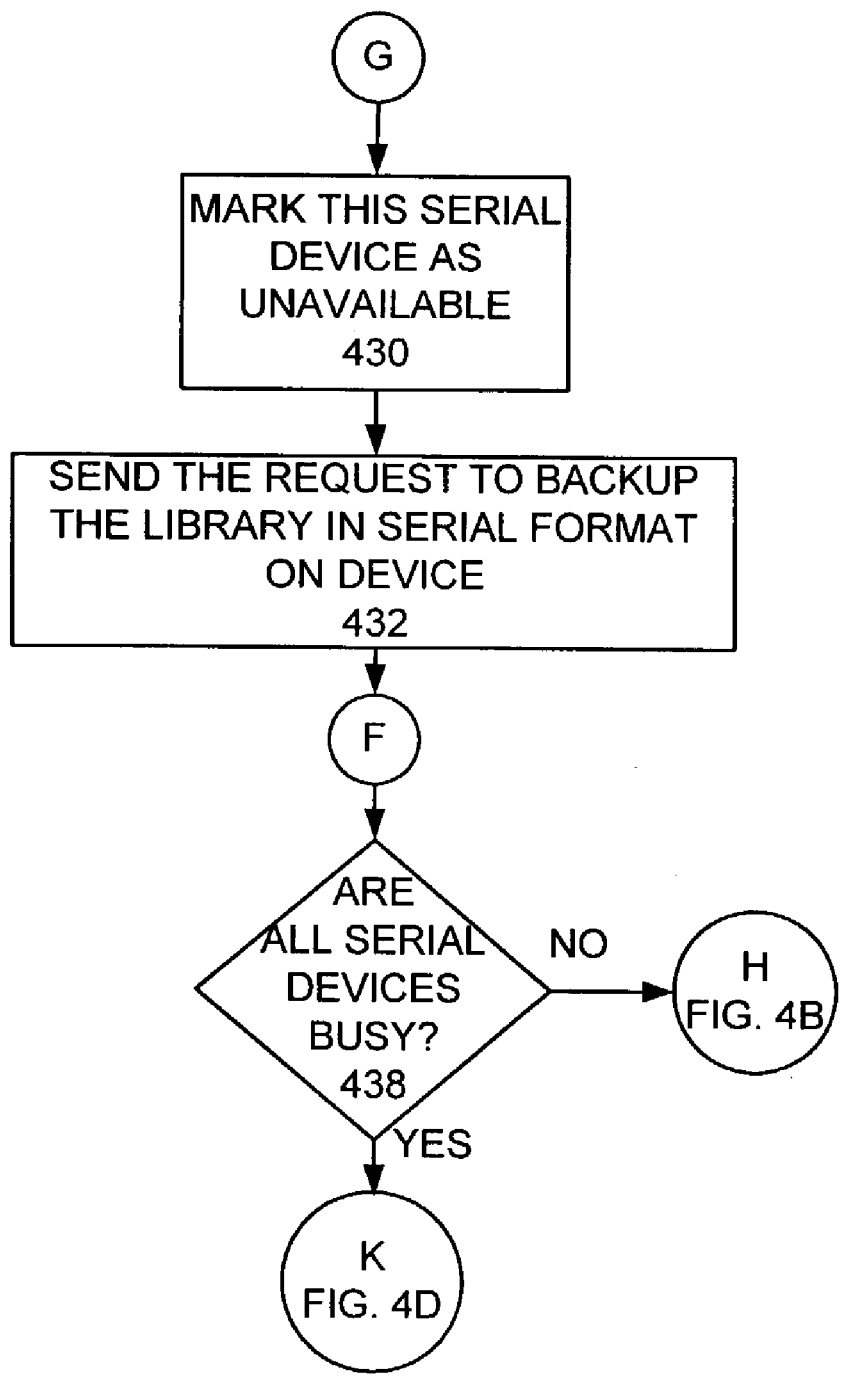

Referring now to FIG. 4C, following entry point G then the serial device is marked as unavailable as indicated in a block 430. The request to backup the library in serial format is sent on the device as indicated in a block 432. Then following entry point F, checking whether all serial devices are busy is performed as indicated in a decision block 438. If all serial devices are not busy, then the sequential operations continue following entry point H in FIG. 4B to process a next device in the serial device list. Otherwise if all serial devices are busy, then the sequential operations continue following entry point Kin FIG. 4D.

Figure 4D:
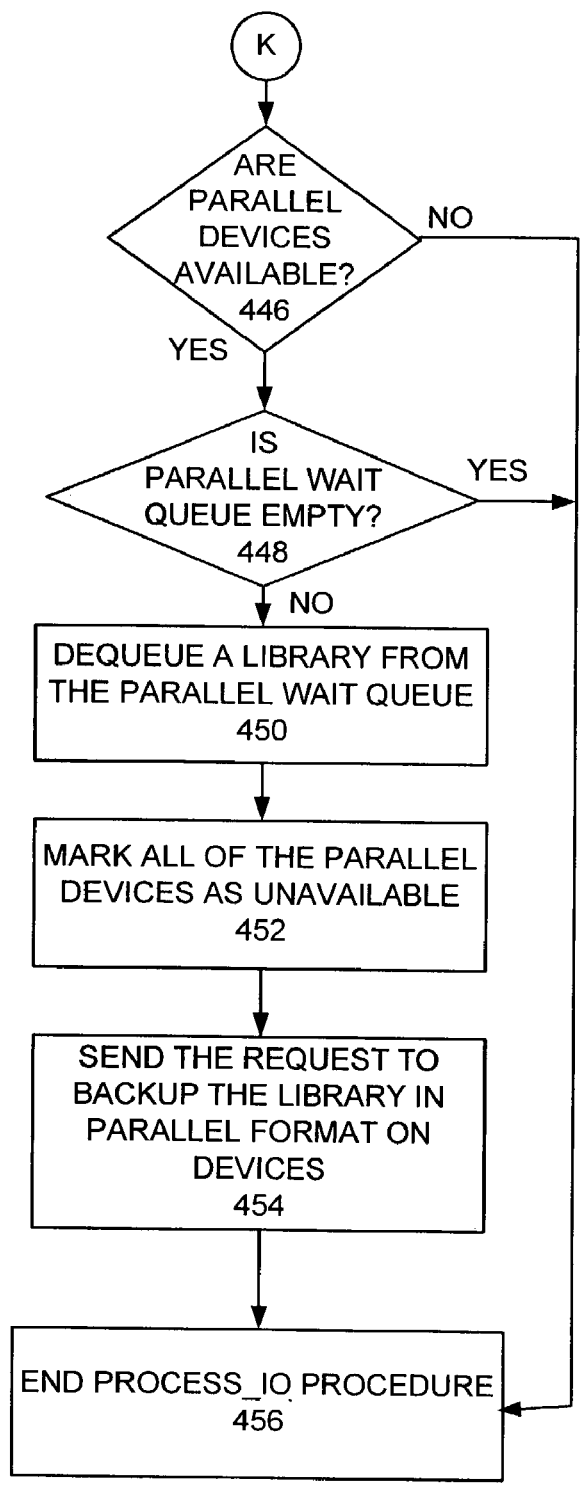

Referring now to FIG. 4D, following entry point K then checking is performed to determine whether all parallel devices are available as indicated in a decision block 446. If all parallel devices are available, checking is performed to determine whether the parallel wait queue is empty as indicated in a decision block 448. If the parallel wait queue is not empty, then a library from the parallel wait queue is dequeued as indicated in a block 450. All of the parallel devices are marked as unavailable as indicated in a block 452. Then the request to backup the library in parallel format on devices is sent as indicated in a block 454. Then and when determined at decision block 446 that all parallel devices are not available or when determined at decision block 448 that the parallel wait queue is empty, the process_IO procedure ends as indicated in a block 456.

Figure 5:
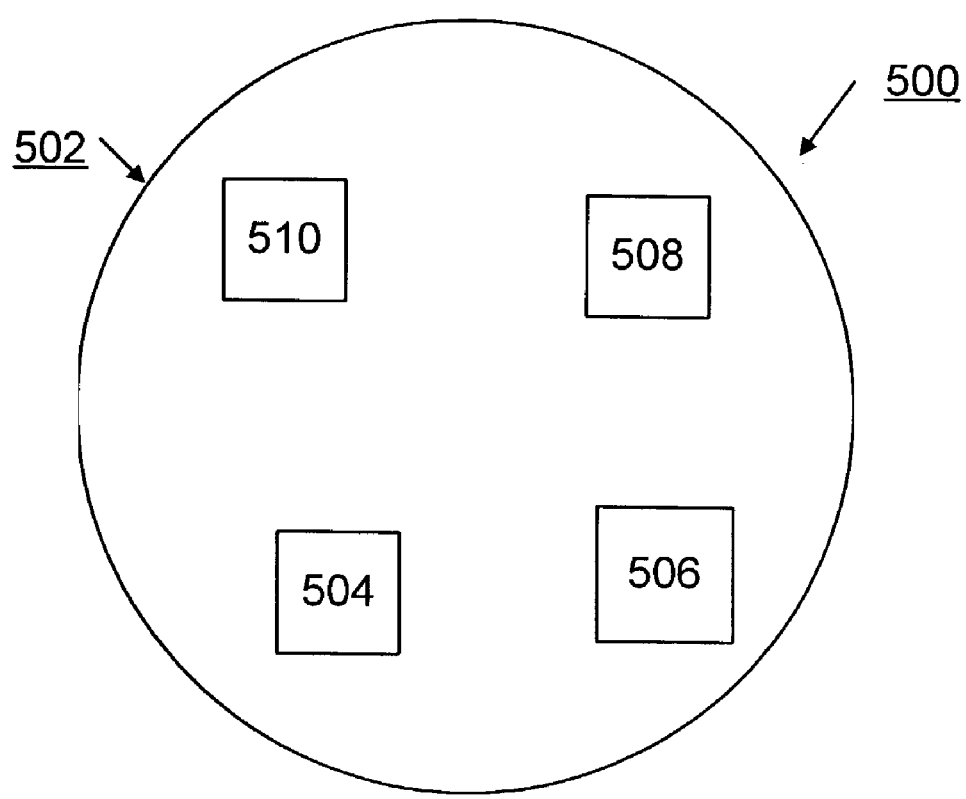
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for implementing enhanced autonomic data backup using multiple backup devices of the preferred embodiment in the system 100 of FIG. 1.

A sequence of program instructions or a logical assembly of one or more interrelated modules defined by the recorded program means 504, 506, 508, 510, direct the computer system 100 for implementing enhanced autonomic data backup using multiple backup devices of the preferred embodiment.

While the present invention has been described with reference to the details of the embodiments of the invention shown in the drawing, these details are not intended to limit the scope of the invention as claimed in the appended claims.

What is claimed is:

1. A method for implementing enhanced autonomic data backup of libraries using multiple backup devices comprising the steps of:
   defining a media definition object for saving a plurality of predefined user selections including a default backup format to be used, and an order to process the libraries;
   starting a backup procedure;
   identifying predefined user selections utilizing said media definition object,
   generating a list of libraries for backup responsive to an identified order to process the libraries;
   processing each library in said generated list of libraries for backup using said identified predefined user selections to form at least one library queue of each of a serial device wait queue and a parallel device wait queue; and
   calling a process IO procedure until backup completes for each said library from said at least one library queue of each of said serial device wait queue and said parallel device wait queue.

2. A method for implementing enhanced autonomic data backup of libraries using multiple backup devices as recited in claim 1 wherein the step of generating said list of libraries includes the step of generating said list of libraries by a user specified order of the libraries.

3. A method for implementing enhanced autonomic data backup of libraries using multiple backup devices as recited in claim 1 wherein the step of generating said list of libraries includes the step of generating said list by size order of the libraries from largest to smallest.

4. A method for implementing enhanced autonomic data backup of libraries using multiple backup devices as recited in claim 1 wherein the step of processing each library in said generated list of libraries includes the step of adding each said library to said serial device wait queue responsive to said default backup format of serial format.

5. A method for implementing enhanced autonomic data backup of libraries using multiple backup devices as recited in claim 1 wherein the step of processing each library in said generated list includes the step of adding each said library to said parallel device wait queue responsive to said default backup format of parallel format.

6. A method for implementing enhanced autonomic data backup of libraries using multiple backup devices as recited in claim 1 wherein said media definition object for saving said plurality of predefined user selections includes a library size exception; and wherein the step of processing each library in said generated list of libraries includes the steps, for each said library, of comparing a library size to said library size exception; and adding said library to said serial device wait queue responsive to said library size being less than or equal to said library size exception.

7. A method for implementing enhanced autonomic data backup of libraries using multiple backup devices as recited in claim 6 includes the step of adding said library to said parallel device wait queue responsive to said library size being greater than said library size exception.

8. A method for implementing enhanced autonomic data backup of libraries using multiple backup devices as recited in claim 1 wherein said media definition object for saving said plurality of predefined user selections includes a list of backup devices and a maximum number of backup devices to be used serially and further includes the steps of identifying said maximum number of backup devices to be used serially and building a serial device list of devices to be used in serial of the multiple backup devices.

9. A method for implementing enhanced autonomic data backup of libraries using multiple backup devices as recited in claim 8 includes the step of building a parallel device list of devices to be used in parallel of the multiple backup devices.

10. A method for implementing enhanced autonomic data backup of libraries using multiple backup devices as recited in claim 9 wherein the step of calling said process IO procedure until backup completes for each said library from said at least one library queue includes the steps identifying all libraries queued for backup and said serial device wait queue not being empty; and for each device in said serial device list, checking for an available device; and responsive to identifying said available device, dequeuing a library from said serial device wait queue, marking said device as unavailable and sending a request to backup the library in serial format on said device.

11. A method for implementing enhanced autonomic data backup of libraries using multiple backup devices as recited in claim 10 includes the steps of checking said parallel device list for all available parallel devices; and responsive to identifying said all available parallel devices, dequeuing a library from said parallel device wait queue, marking said devices as unavailable and sending a request to backup the library in parallel format on said devices.

12. A method for implementing enhanced autonomic data backup of libraries using multiple backup devices as recited in claim 10 includes the steps of identifying all libraries queued for backup and said serial device wait queue being empty; moving all devices from said serial device list to said parallel device list; checking said parallel device list for all available parallel devices; and responsive to identifying said all available parallel devices, dequeuing a library from said parallel device wait queue, marking said devices as unavailable and sending a request to backup the library in parallel format on said devices.

13. Apparatus for implementing enhanced autonomic data backup of libraries using multiple backup devices comprising:
a media definition object for saving a plurality of predefined user selections including a default backup format to be used, an order to process the libraries, a library exception size, and a maximum number of backup devices to be used serially;
a data backup control program; said data backup control program utilizing said media definition object for identifying predefined user selections and forming at least one library queue of each of a serial device wait queue and a parallel device wait queue for backup using said identified predefined user selections; and calling a process IO procedure until backup completes for each said library from said at least one library queue of each of said serial device wait queue and said parallel device wait queue.

14. Apparatus for implementing enhanced autonomic data backup of libraries using multiple backup devices as recited in claim 13 wherein said default backup format to be used includes one of each of a parallel format for each library and a serial format for each library.

15. Apparatus for implementing enhanced autonomic data backup of libraries using multiple backup devices as recited in claim 13 wherein said order to process the libraries includes either a user specified order of the libraries or a size order of the libraries from largest to smallest.

16. Apparatus for implementing enhanced autonomic data backup of libraries using multiple backup devices as recited in claim 13 wherein said library exception size is used by said data backup control program for comparing a library size of each library to said library exception size; and adding each library having said library size less than or equal to said library size exception to said serial device wait queue and adding each library having said library size greater than said library size exception to said parallel device wait queue.

17. A computer program product for implementing enhanced autonomic data backup of libraries using multiple backup devices, said computer program product including a plurality of computer executable instructions stored on a computer, wherein said instructions, when executed by the computer memory system, cause the computer to perform the steps of:
defining a media definition object for saving a plurality of predefined user selections; said predefined user selections including a default backup format to be used, an order to process the libraries, a library exception size, and a maximum number of backup devices to be used serially;
starting a backup procedure;
generating a list of libraries responsive to said order to process the libraries;
processing each library in said generated list of libraries for backup using said identified predefined user selections to form at least one library queue of each of a serial device wait queue and a parallel device wait queue responsive to at least one of said backup format and said library exception size; and
calling a process IO procedure until backup completes for each said library from said at least one library queue of each of said serial device wait queue and said parallel device wait queue.

18. A computer program product for implementing enhanced autonomic data backup of libraries as recited in claim 17 wherein the step of generating said list of libraries responsive to said order to process the libraries includes one of generating said list of libraries by a user specified order of the libraries or generating said list of libraries by size order of the libraries from largest to smallest.

19. A computer program product for implementing enhanced autonomic data backup of libraries as recited in claim 17 wherein the step of processing each library in said generated list of libraries to form at least one library queue of a serial device wait queue and a parallel device wait queue responsive to at least one of said backup format and said library exception size includes the steps of comparing a library size of each library to said library exception size; adding each library having said library size less than or equal to said library size exception to said serial device wait queue; and adding each library having said library size greater than said library size exception to said parallel device wait queue.

20. A computer program product for implementing enhanced autonomic data backup of libraries as recited in claim 17 includes the steps of identifying said maximum number of backup devices to be used serially; building a serial device list; and building a parallel device list.

* * * * *